US008730686B2

(12) United States Patent
Feng et al.

(10) Patent No.: US 8,730,686 B2
(45) Date of Patent: May 20, 2014

(54) DUAL-INPUT NINE-PHASE AUTOTRANSFORMER FOR ELECTRIC AIRCRAFT AC-DC CONVERTER

(75) Inventors: Frank Z. Feng, Loves Park, IL (US); Mustansir Kheraluwala, Lake Zurich, IL (US); Waleed M. Said, Rockford, IL (US); John Huss, Roscoe, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 315 days.

(21) Appl. No.: 13/248,237

(22) Filed: Sep. 29, 2011

(65) Prior Publication Data

US 2013/0083574 A1 Apr. 4, 2013

(51) Int. Cl.
*H02M 3/335* (2006.01)

(52) U.S. Cl.
USPC .......... 363/17; 336/170

(58) Field of Classification Search
USPC .......... 363/34–39, 64, 66, 69, 71, 144, 154; 336/10, 12, 144, 147, 170, 178, 180, 336/200
See application file for complete search history.

(56) References Cited

U.S. PATENT DOCUMENTS 5,198,969 A * 3/1993 Redl et al. .......... 363/17
5,619,407 A * 4/1997 Hammond .......... 363/155
6,166,930 A * 12/2000 Czerwinski .......... 363/44
6,249,443 B1 6/2001 Zhou et al.
6,335,872 B1 1/2002 Zhou et al.
6,574,125 B2 * 6/2003 Matsukawa et al. .......... 363/71
6,807,361 B1 10/2004 Girgensohn et al.
7,274,280 B1 9/2007 Paice
7,362,596 B2 * 4/2008 Gjerde et al. .......... 363/69
7,535,738 B2 * 5/2009 Wei et al. .......... 363/71
7,750,782 B1 7/2010 Paice
7,796,413 B2 9/2010 Furmanczyk
2005/0077887 A1 4/2005 Sarlioglu et al.
2006/0001516 A1 1/2006 Mazur et al.
2008/0186749 A1 8/2008 Blanchery
2010/0176755 A1 7/2010 Hoadley et al.
2011/0051480 A1 * 3/2011 Blanchery .......... 363/154

OTHER PUBLICATIONS

The extended European Search Report in counterpart European Application No. 12184367.6 filed Sep. 14, 2012.

* cited by examiner

*Primary Examiner* — Rajnikant Patel
(74) *Attorney, Agent, or Firm* — Kinney & Lange, P.A.

(57) ABSTRACT

A dual-input nine-phase autotransformer converts first and second three-phase AC inputs to a nine-phase AC output. The autotransformer includes input terminals for connection to a first three-phase AC input and a second three-phase AC input smaller than the first three-phase AC input. The autotransformer includes a first plurality of coils, a second plurality, and a third plurality of coils wound on respective phase legs of the autotransformer. The autotransformer includes a plurality of output terminals for providing a plurality of AC output voltages, and a plurality of internal terminals for connecting the first, second, and third plurality of coils in a configuration that provides a 40° phase shift in the AC outputs provided by the dual-input nine-phase autotransformer.

8 Claims, 3 Drawing Sheets

DUAL-INPUT NINE-PHASE AUTOTRANSFORMER FOR ELECTRIC AIRCRAFT AC-DC CONVERTER

BACKGROUND

The present invention is related to autotransformers, and in particular to a dual-input nine-phase autotransformer.

An autotransformer is an electrical transformer with only one winding that acts as both the primary and secondary winding associated with a typical transformer. As a result, autotransformers can be smaller, lighter and cheaper than standard dual-winding transformers. This makes autotransformers an attractive alternative in application (such as aircraft applications) in which weight is an important factor.

Autotransformers are often-times employed in AC-DC power conversion systems. In theory, AC-DC power conversion may be accomplished with a plurality of diode pairs, each pair connected to a different phase of the AC input, to provide a rectified output. However, this type of rectifier leads to substantial current harmonics that pollute the electric power generation and distribution system. To reduce current harmonics, autotransformers are employed to increase the number of AC phases supplied to the rectifier unit. For example, in an eighteen-pulse converter (an AC-DC converter having an eighteen step staircase current waveform at each of the AC inputs) the autotransformer is used to transform the three-phase AC input, whose phases are spaced at 120°, into a system with nine phases spaced at 40°. This has the effect of reducing the harmonics associated with the AC-DC conversion.

SUMMARY

A dual-input nine-phase autotransformer converts first and second three-phase AC inputs to a nine-phase AC output. The autotransformer includes a first plurality of input terminals for connection to a first three-phase AC input and a second plurality of input terminals for connection to a second three-phase AC input. The autotransformer includes a first plurality of coils A0-A6 wound on a first phase leg of the autotransformer, a second plurality of coils B0-B6 wound on a second phase leg of the autotransformer, and a third plurality of coils C0-C6 wound on a third phase leg of the autotransformer. The autotransformer includes a plurality of output terminals for providing a plurality of AC output voltages, and a plurality of internal terminals for connecting the first, second, and third plurality of coils in a configuration that provides a 40° phase shift in the AC outputs provided by the dual-input nine-phase autotransformer.

DETAILED DESCRIPTION

Figure 1:
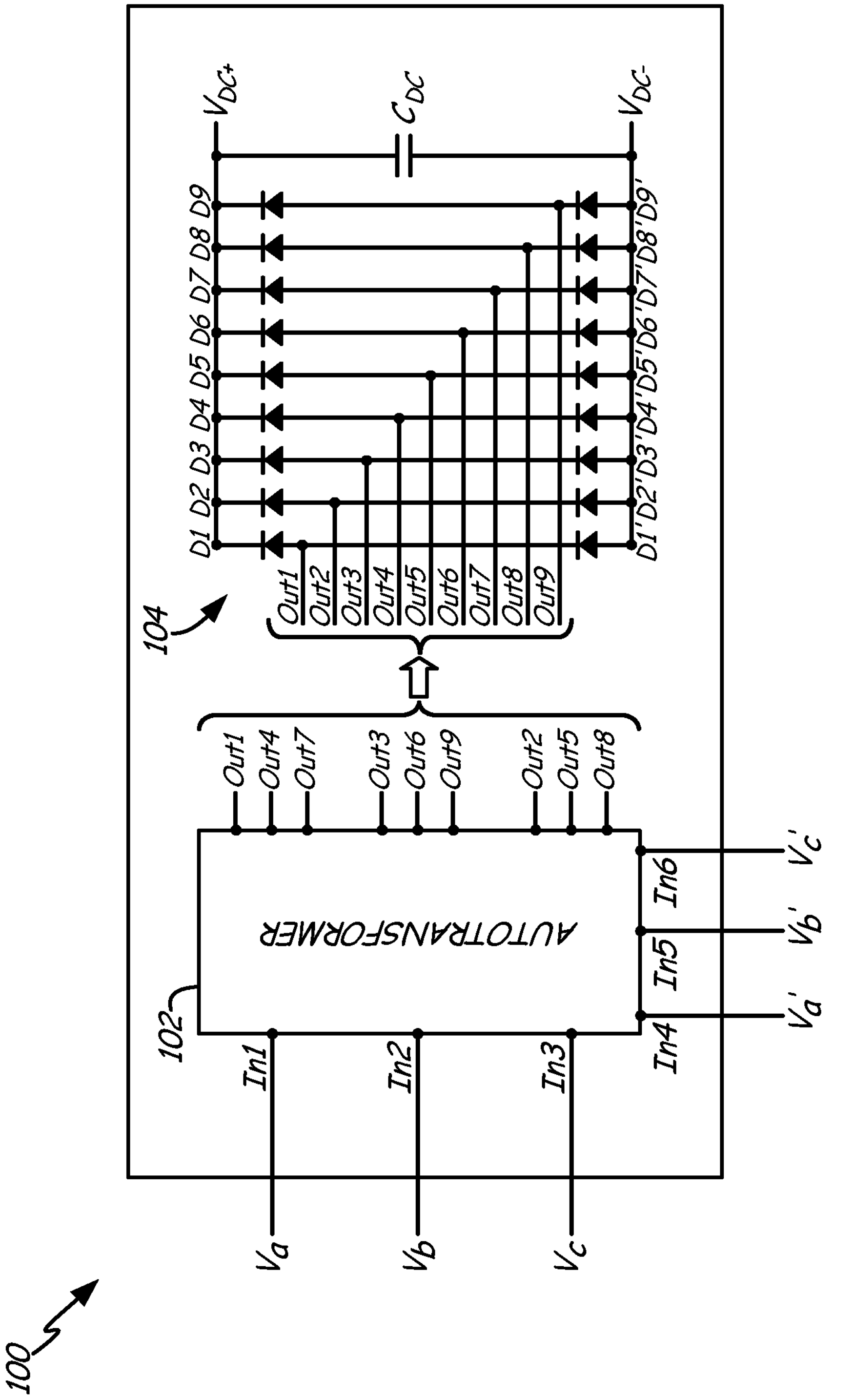
FIG. 1 is a circuit diagram of a dual-input nine-phase autotransformer rectifier unit according to an embodiment of the present invention.

FIG. 1 is a circuit diagram of alternating current (AC) to direct current (DC) power conversion system 100 according to an embodiment of the present invention. Power conversion system 100 includes dual-input nine-phase autotransformer 102 (hereinafter, "autotransformer 102"), rectifier unit 104, and DC link capacitor $C_{DC}$. Autotransformer 102 includes first AC input terminals In1, In2, In3 and second AC input terminals In4, In5, In6. Each of the labeled input terminals represents a terminal connection point to the windings associated with autotransformer 102. The location of terminals associated with first AC input terminal In1, In2, In3, and second AC input terminal In4, In5, In6 is described in the vector diagram shown in FIG. 3. First AC input terminals In1, In2, In3 are connected to receive AC power labeled Va, Vb, Vc, respectively, while second AC input terminals In4, In5, In6 are connected to receive AC power labeled Va', Vb', Vc'. For example, in an aircraft application AC power labeled Va, Vb, Vc may be 230 Volt (V) AC power provided by an on-board generator, while AC power labeled Va', Vb', Vc' may be 115 V AC power delivered by a ground cart when the aircraft is on the ground.

Depending on the application, autotransformer 102 is configured to step up or step down the voltage provided at first input terminals In1, In2, In3 and second input terminals In4, In5, In6. For example, in one embodiment the voltage provided at the first input terminals is stepped down within a range defined by the ratio between the output voltage of the autotransformer (e.g., voltage Vout provided at output terminal Out1) and the input voltage Va provided at one of the first input terminals (e.g., Vout/Va=$\gamma$, where $0.5 \leq \gamma \leq 1$). Likewise, in another embodiment the voltage provided at second input terminals is stepped up within a range defined by the ratio between the output voltage of the autotransformer (e.g., voltage Vout provided at output terminal Out1) and the input voltage Va' provided at one of the second input terminals (e.g., Vout/Va'=$\gamma$, where $1 \leq 2\gamma \leq 2$). In this way, two input sources may be employed to generate the desired DC output voltage for provision to attached loads. Likewise, autotransformer 102 includes nine output terminals Out1, Out2, Out3, Out4, Out5, Out6, Out7, Out8, Out9 that are connected to rectifier unit 104 for rectification to the desired DC output.

Rectifier unit 104 includes a plurality of diode pairs (labeled D1 and D1', D2 and D2', D3 and D3', D4 and D4', D5 and D5', D6 and D6', D7 and D7', D8 and D8', and D9 and D9'), each pair connected to one of the plurality of output phases provided by autotransformer 12. Diodes D1-D9 are connected to output terminals Out1-Out9, respectively, to provide a positive rectified output voltage to DC output voltage Vdc+. Likewise, diodes D1'-D9' are connected to output terminals Out1-Out9, respectively, to provide a negative rectified output voltage to DC output voltage Vdc−. In the embodiment shown in FIG. 1, rectifier unit 104 includes 18 diodes, making AC-DC power conversion system an eighteen-pulse converter.

Figure 2:
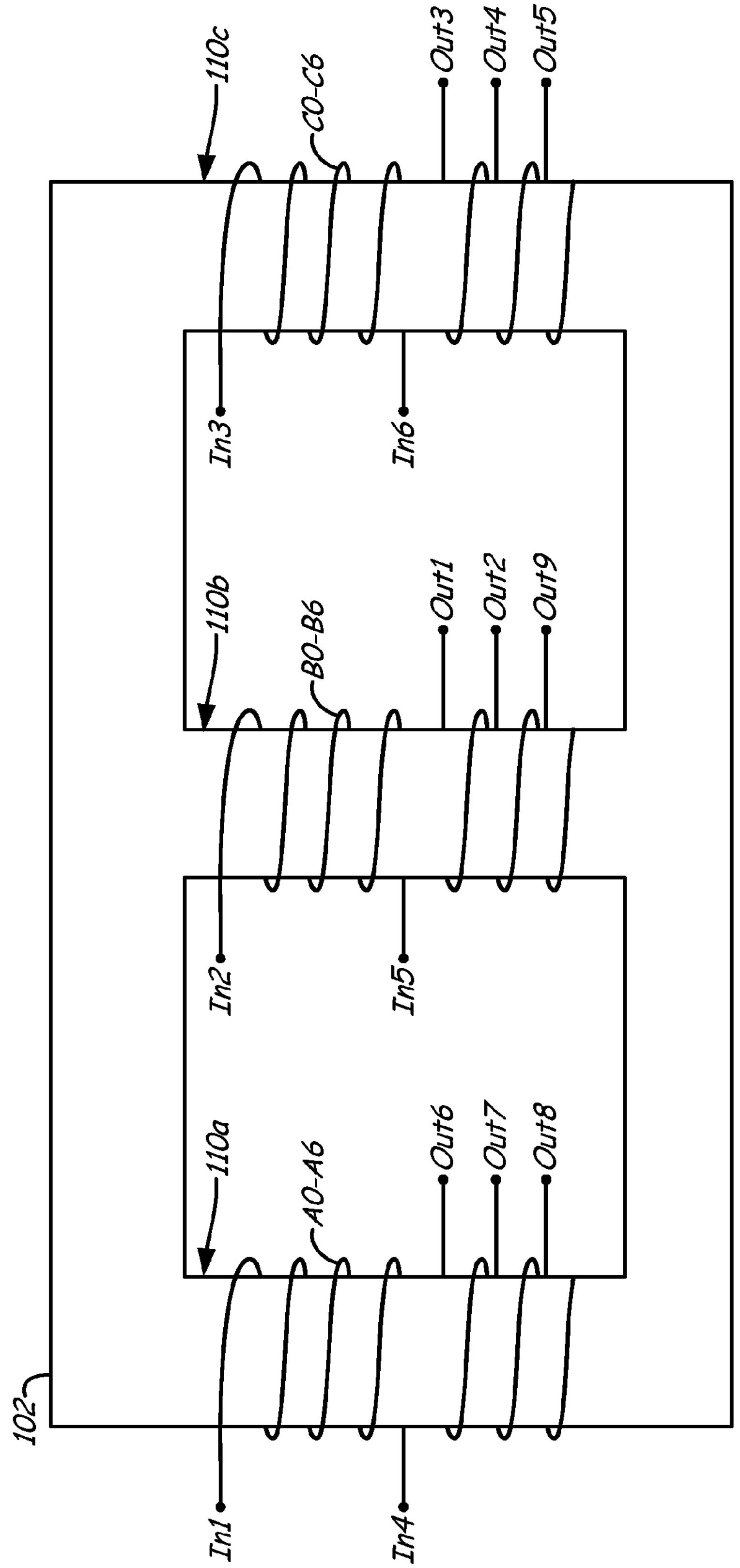
FIG. 2 is a simple cross-sectional view of the dual-input nine-phase autotransformer according to an embodiment of the present invention.

FIG. 2 is a simple cross-sectional diagram of dual-input nine-phase autotransformer 102 according to an embodiment of the present invention. In the embodiment shown in FIG. 2, autotransformer 102 includes three phase-legs labeled 110*a*, 110*b*, and 110*c*. Each phase leg 110*a*, 110*b*, 110*c* is associated with one phase of the three-phase AC input provided to autotransformer 102. For example, AC input voltage Va provided to autotransformer 102 at input terminal In1 is provided to coils wound around phase leg 110*a*. Likewise, AC input voltage Vb provided to autotransformer 102 at input terminal In2 is provided to coils wound around phase leg 110*b*, and AC input voltage Vc provided at input terminal In3 is provided to coils wound around phase leg 110*c*. As a dual-input autotransformer, each phase leg also includes a second input terminal for connection to a second AC input. For example, AC input voltage Va' provided to autotransformer 102 at input terminal In4 is provided to coils wound around phase leg 110*a*. Likewise, AC input voltage Vb' provided to autotransformer 102 at input terminal In5 is provided to coils wound around phase leg 110*b*, and AC input voltage Vc' provided to autotransformer 102 at input terminal In6 is provided to coils wound around phase leg 110*c*.

The plurality of output terminals Out1-Out9 are connected to one of the three phase legs 110*a*, 110*b*, and 110*c*. For example, AC output terminals Out6, Out7, Out8 are associated with phase leg 110*a*. Likewise, AC output terminals Out1, Out2, Out9 are associated with phase leg 110*b*, and AC output terminals Out3, Out4, and Out5 are associated with phase leg 110*c*.

Figure 3:
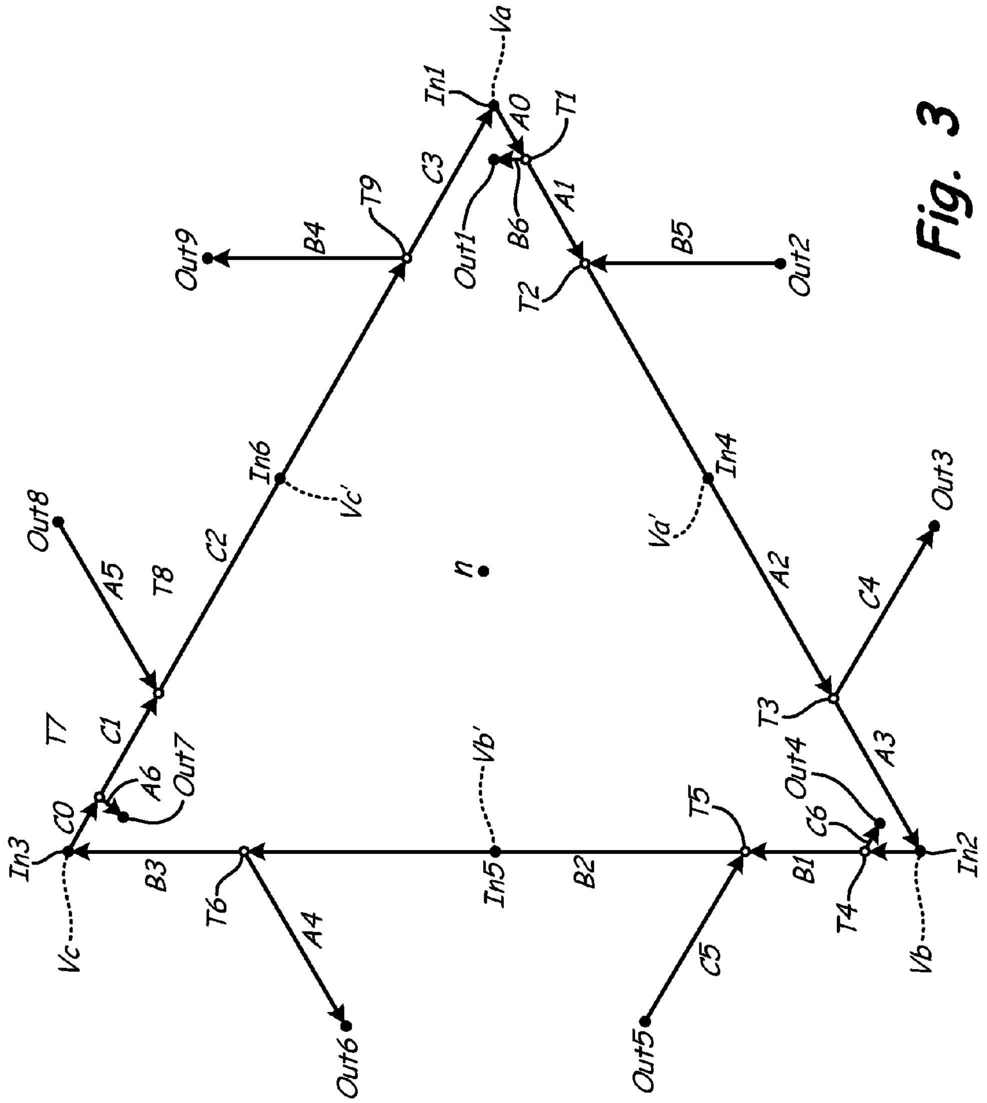
FIG. 3 is a vector diagram illustrating a winding configuration of the dual-input nine-phase autotransformer according to an embodiment of the present invention.

As described in more detail with respect to the vector diagram shown in FIG. 3, a plurality of coils is wound around each phase leg. For example, in one embodiment three groups of seven coils (labeled in FIG. 3 as coils A0-A6, B0-B6, and C0-C6) are wound around phase legs 110*a*, 110*b*, and 110*c*, respectively. The number of turns (i.e., length) of each coil is varied, and a plurality of interconnections internal to autotransformer 102 allow connections to be made between various coils on each of the three phase legs 110*a*, 110*b*, 110*c*. The number of coils, the turns of each coil, and the interconnection between various coils affects the performance of autotransformer 102. The simple cross-sectional view shown in FIG. 2 does not illustrate the plurality of coils associated with each phase leg, or the turns or various interconnections of the coils with one another. A particular configuration of the plurality of coils associated with each phase leg according to an embodiment of the present invention is illustrated in the vector diagram shown in FIG. 3.

FIG. 3 is a vector diagram illustrating a winding configuration of dual-input nine-phase autotransformer 102 according to an embodiment of the present invention. In the embodiment shown in FIG. 3, autotransformer 102 is a symmetrical system, such that the number of coils, and winding turns associated with each of the coils is symmetrical between each of the phase legs 110*a*, 110*b*, and 110*c*. The phase shift between respective output terminals is illustrated by the angle measured between two output terminals based on point n (located in the middle of the triangular shape). For example, the phase shift between output terminal Out1 and output terminal Out9 is 40°. Similarly, the phase shift between output terminal Out9 and output terminal Out8 is 40°. It is a goal of autotransformer 102 to provide a nine-phase output in which each of the output phases is shifted 40° relative to one another.

The vector diagram shown in FIG. 3 illustrates schematically the electrical configuration of coils in autotransformer 102. In particular, all straight line arrows in the vector diagram represent coils, with the length of the straight line arrow being proportional to the number of winding turns of the coil. The polarity of the coil is defined by the direction of the arrow. All lines of the same orientation represent a same phase of the three-phase input provided to autotransformer 102. Output terminals for connection to rectifier unit 104 are denoted with black dots and are labeled Out1-Out9, as denoted in FIG. 1. Internal connections within autotransformer 102 are denoted with circles and are labeled internal terminals T1-T9. Each winding connected between either output terminals Out1-Out9 or internal terminals T1-T9 is denoted with a coil number. For example, coils associated with phase leg 110*a* includes coils A0-A6, while coils associated with phase leg 110*b* include coils B0-B6 and coils associated with phase leg 110*c* includes coils C0-C6. The direction of the arrows representing each of the windings is dictated by the phase of the winding. For example, all coils associated with phase leg 110*a* (e.g., coils A0-A6) point the same direction, with the same holding true for all coils associated with phase legs 110*b* and 110*c*, respectively. The phase difference or angle between the AC inputs Va, Vb, Vc provided to first AC input terminals In1, In2, In3 is 120°, respectively. Similarly, the phase difference between the AC inputs Va', Vb', and Vc' provided via second AC input terminals In4, In5, In6 is also 120°.

In the embodiment shown in FIG. 2, first AC input terminals In1, In2, In3 form the corners of a triangle. Likewise, second AC input terminals In4, In5, In6 are connected at the midpoint of coils A2, B2, and C2, respectively. Coils A0-A3 are connected in series with one another via the plurality of internal terminals T1, T2, and T3. Likewise, coils B0-B3 are connected in series via the plurality of internal terminals T4, T5, T6, and coils C0-C3 are connected in series via the plurality of internal terminals T7, T8, and T9. Coils A0 and C3 are connected together at input terminal In1, which is connected to AC input voltage Va. Likewise, coils B0 and A3 are connected together at input terminal In2, which is connected to AC input voltage Vb, and coils C0 and B3 are connected together at input terminal In3, which is connected to AC input voltage Vc.

In the embodiment shown in FIG. 3, connection to each of the plurality of output terminals is as follows. Coil B6 is connected between output terminal Out1 and internal terminal T1, located between coils A0 and A1. Coil B5 is connected between output terminal Out2 and internal terminal T2, located between coils A1 and A2. Coil C4 is connected between output terminal Out3 and internal terminal T3, located between coils A2 and A3. Coil C6 is connected between output terminal Out4 and internal terminal T4 located between coils B0 and B1. Coil C5 is connected between output terminal Out5 and internal terminal T5 located between coils B1 and B2. Coil A4 is connected between output terminal Out6 and internal terminal T6 located between coils B2 and B3. Coil A6 is connected between output terminal Out7 and internal terminal T7 located between coils C0 and C1. Coil A5 is connected between output terminals Out8 and internal terminal T8 located between coils C1 and C2. Coil B4 is connected between output terminal Out9 and internal terminal T9 located between coils C2 and C3.

The configuration of windings illustrated in FIG. 3 generates nine phase-shifted outputs (via output terminals Out1-Out9) that are provided to rectifier unit 104, which includes a pair of diodes associated with each input to provide an 18-pulse rectifier unit. The AC outputs (Out1-Out9) provided by autotransformer 102 are phase-shifted relative to one another by the desired amount (e.g., 40°). In addition, the size of autotransformer 102 is determined, in part, by the number of windings employed and the number of turns or length of each coil. For example, first output terminal Out1 is provided at a phase equal to that of first AC input terminal In1. Coil A0 (located on phase leg 110*a*) is connected to input terminal In1 on one end, and to internal terminal T1 at the other end. Coil B6 (located on phase leg 110*b*) is connected to internal terminal T1, and terminates at AC output terminal Out1. As illustrated by the physical location of AC output terminal Out1 in the vector diagram shown in FIG. 3, AC output terminal Out1 is in-phase with the AC input Va provided at input terminal In1. Coil A1 is connected to internal terminal T1, and terminates at internal terminal T2. Coil B5 is connected to internal terminal T2, and terminates at AC output terminal Out2. The phase difference between the AC output provided at output terminal Out1 and the AC output provided at output terminal Out2 is 40°.

The length or number of turns associated with each coil is a function of the desired step up/step down voltage associated with autotransformer 102. For example, for a step down ratio of γ=0.875, the following coil configurations are employed:

| Coil | Number of turns |
|---|---|
| A0, B0, C0 | $n_0$ |
| A1, B1, C1 | $n_1 = 1.638 * n_0$ |
| A2, B2, C2 | $n_2 = 6.725 * n_0$ |
| A3, B3, C3 | $n_3 = 2.638 * n_0$ |
| A4, B4, C4 | $n_4 = 2.578 * n_0$ |
| A5, B5, C5 | $n_5 = 2.578 * n_0$ |
| A6, B6, C6 | $n6 = 0.5 * n_0$ |

In other embodiments, depending on the step-up/step-down ratio, the number of turns associated with each coil is varied to provide the desired output. A benefit of the configuration illustrated in FIG. 3, is the ability to include both step-up/step-down functionality in a single, symmetrical autotransformer. In addition, the configuration of coils minimizes the apparent power kVA rating of the autotransformer.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A dual-input nine-phase autotransformer comprising:

a first plurality of coils A0-A6 wound on a first phase leg of the autotransformer, each coil A0-A6 defined, in part, by a number of winding turns associated with the coil;

a second plurality of coils B0-B6 wound on a second phase leg of the autotransformer, each coil B0-B6 defined, in part, by a number of winding turns associated with the coil;

a third plurality of coils C0-C6 wound on a third phase leg of the autotransformer, each coil C0-C6 defined, in part, by a number of winding turns associated with the coil;

a first plurality of input terminals In1, In2, In3 connected to provide a first three-phase AC input to the first, second and third plurality of coils;

a second plurality of input terminals In4, In5, In6 connected to provide a second three-phase AC input to the first, second and third plurality of coils, wherein the second three-phase AC input has a magnitude less than the first three-phase AC input;

a plurality of output terminals Out1, Out2, Out3, Out4, Out5, Out6, Out7, Out8, and Out9 connected to the first, second and third plurality of coils for providing a plurality of AC output voltages; and a plurality of internal terminals T1, T2, T3, T4, T5, T6, T7, T8, and T9 for connecting the first, second and third plurality of coils in a configuration that provides a desired 40° phase shift in the AC outputs provided at the plurality of output terminals Out1-Out9, respectively, and provides a constant AC output voltage regardless of whether the first AC input is provided at the first plurality of input terminals In1, In2, In3 or the second AC input is provided at the second plurality of input terminals In4, In5, In6;

wherein the number of winding turns associated with coils A0-A6, B0-B6, and C0-C6 are defined by the following table of ratios scaled to a number of winding turns $n_0$ associated with coils A0, B0, and C0:

| Coil | Number of turns |
|---|---|
| A0, B0, C0 | $n_0$ |
| A1, B1, C1 | $n_1 = 1.638 * n_0$ |
| A2, B2, C2 | $n_2 = 6.725 * n_0$ |
| A3, B3, C3 | $n_3 = 2.638 * n_0$ |
| A4, B4, C4 | $n_4 = 2.578 * n_0$ |
| A5, B5, C5 | $n_5 = 2.578 * n_0$ |
| A6, B6, C6 | $n6 = 0.5 * n_0$. |

2. The dual-input nine-phase autotransformer of claim 1, wherein coils A0-A3 are connected in series via internal terminals T1, T2 and T3, coils B0-B3 are connected in series via internal terminals T4, T5 and T6, and coils C0-C3 are connected in series via internal terminals T7, T8 and T9, wherein coils A0 and C3 are connected to one another at input terminal In1, coils B0 and A3 are connected to one another at input terminal In2, and coils C0 and B3 are connected to one another at input terminal In3.

3. The dual-input nine-phase autotransformer of claim 2, wherein the second plurality of AC input terminals In4, In5, and In6 connected to provide a second three-phase AC input to the first, second and third plurality of coils is connected to midpoints of coils A2, B2, and C2, respectively.

4. The dual-input nine-phase autotransformer of claim 3, wherein coil B6 is connected between output terminal Out1 and internal terminal T1 located between coils A0 and A1, wherein coil B5 is connected between output terminal Out2 and internal terminal T2 located between coils A1 and A2, wherein coil C4 is connected between output terminal Out3 and internal terminal T3 located between coils A2 and A3, wherein coil C6 is connected between output terminal Out4 and internal terminal T4 located between coils B0 and B1, wherein coil C5 is connected between output terminal Out4 and internal terminal T4 located between coils B1 and B2, wherein coil A4 is connected between output terminal Out6 and internal terminal T6 located between coils B2 and B3, wherein coil A6 is connected between output terminal Out7 and internal terminal T7 located between coils C0 and C1, wherein coil A5 is connected between output terminal Out8 and internal terminal T8 located between coils C1 and C2, and wherein coil A4 is connected between output terminal Out9 and internal terminal T9 located between coils C2 and C3.

5. A power conversion system comprising:

a dual input nine-phase autotransformer comprising:

a first plurality of coils A0-A6 wound on a first phase leg of the autotransformer, each coil A0-A6 defined, in part, by a number of winding turns associated with the coil;

a second plurality of coils B0-B6 wound on a second phase leg of the autotransformer, each coil B0-B6 defined, in part, by a number of winding turns associated with the coil;

a third plurality of coils C0-C6 wound on a third phase leg of the autotransformer, each coil C0-C6 defined, in part, by a number of winding turns associated with the coil;

a first plurality of input terminals In1, In2, In3 connected to provide a first three-phase AC input to the first, second and third plurality of coils;

a second plurality of input terminals In4, In5, In6 connected to provide a second three-phase AC input to the first, second and third plurality of coils, wherein the second three-phase AC input has a magnitude less than the first three-phase AC input;

a plurality of output terminals Out1, Out2, Out3, Out4, Out5, Out6, Out7, Out8, and Out9 connected to the first, second and third plurality of coils for providing a plurality of AC output voltages; and a plurality of internal terminals T1, T2, T3, T4, T5, T6, T7, T8, and T9 for connecting the first, second and third plurality of coils in a configuration that provides a desired 40° phase shift in the AC outputs provided at the plurality of output terminals Out1-Out9, respectively, and provides a constant AC output voltage regardless of whether the first AC input is provided at the first plurality of input terminals In1, In2, In3 or the second AC input is provided at the second plurality of input terminals In4, In5, In6.

a rectifier unit having eighteen diodes connected in pairs to the plurality of output terminals Out1-Out9 associated with the dual-input nine-phase autotransformer for rectifying the plurality of outputs provided by the dual-input nine-phase autotransformer;

wherein the number of winding turns associated with coils A0-A6, B0-B6, and C0-C6 are defined by the following table of ratios scaled to a number of winding turns $n_0$ associated with coils A0, B0, and C0:

| Coil | Number of turns |
|---|---|
| A0, B0, C0 | $n_0$ |
| A1, B1, C1 | $n_1 = 1.638 * n_0$ |
| A2, B2, C2 | $n_2 = 6.725 * n_0$ |
| A3, B3, C3 | $n_3 = 2.638 * n_0$ |
| A4, B4, C4 | $n_4 = 2.578 * n_0$ |
| A5, B5, C5 | $n_5 = 2.578 * n_0$ |
| A6, B6, C6 | $n6 = 0.5 * n_0$. |

6. The dual-input nine-phase autotransformer of claim 5, wherein coils A0-A3 are connected in series via internal terminals T1, T2 and T3, coils B0-B3 are connected in series via internal terminals T4, T5 and T6, and coils C0-C3 are connected in series via internal terminals T7, T8 and T9, wherein coils A0 and C3 are connected to one another at input terminal In1, coils B0 and A3 are connected to one another at input terminal In2, and coils C0 and B3 are connected to one another at input terminal In3.

7. The dual-input nine-phase autotransformer of claim 6, wherein the second plurality of AC input terminals In4, In5, and In6 connected to provide a second three-phase AC input to the first, second and third plurality of coils is connected to midpoints of coils A2, B2, and C2, respectively.

8. The dual-input nine-phase autotransformer of claim 7, wherein coil B6 is connected between output terminal Out1 and internal terminal T1 located between coils A0 and A1, wherein coil B5 is connected between output terminal Out2 and internal terminal T2 located between coils A1 and A2, wherein coil C4 is connected between output terminal Out3 and internal terminal T3 located between coils A2 and A3, wherein coil C6 is connected between output terminal Out4 and internal terminal T4 located between coils B0 and B1, wherein coil C5 is connected between output terminal Out4 and internal terminal T4 located between coils B1 and B2, wherein coil A4 is connected between output terminal Out6 and internal terminal T6 located between coils B2 and B3, wherein coil A6 is connected between output terminal Out7 and internal terminal T7 located between coils C0 and C1, wherein coil A5 is connected between output terminal Out8 and internal terminal T8 located between coils C1 and C2, and wherein coil A4 is connected between output terminal Out9 and internal terminal T9 located between coils C2 and C3.

* * * * *